Sept. 18, 1928.
H. E. PEARSON
POWER DRIVEN SKIS
Filed April 14, 1924
1,684,846
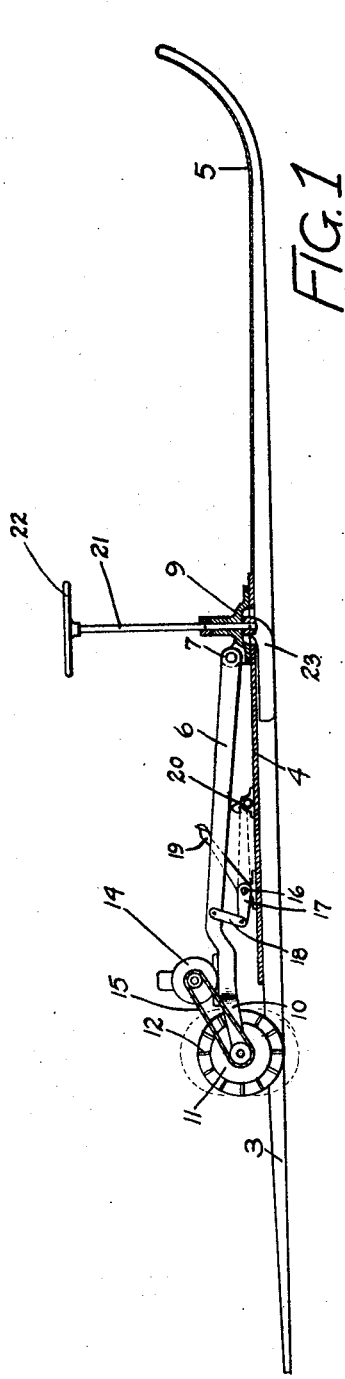
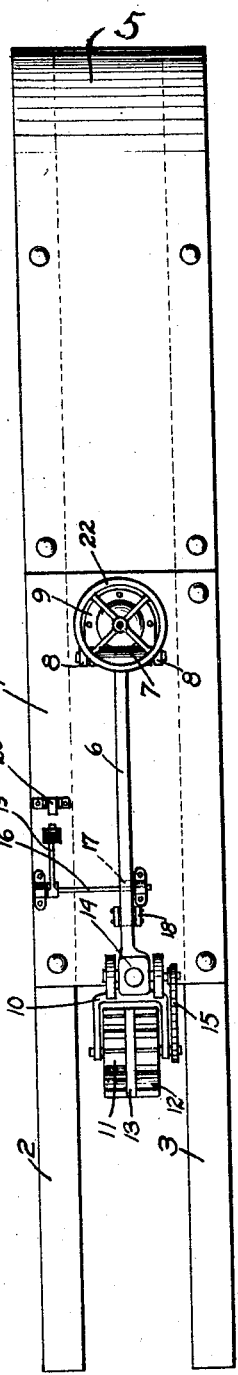
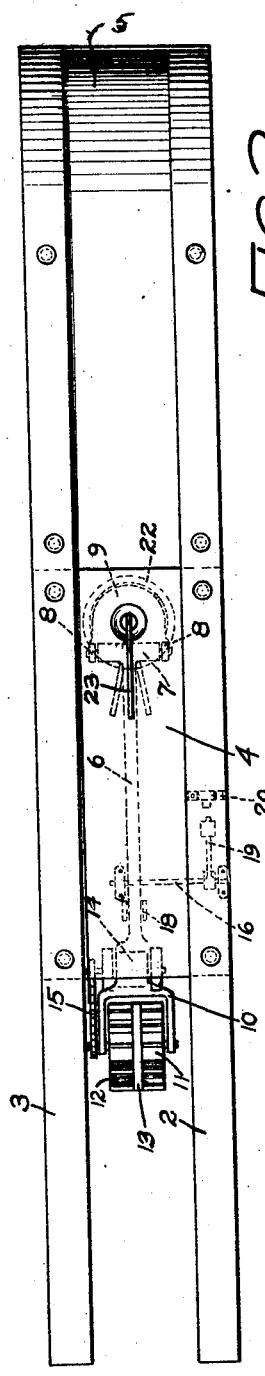
INVENTOR
HERMAN E. PEARSON
BY Paul, Paul & Moore
ATTORNEYS Patented Sept. 18, 1928.

1,684,846

UNITED STATES PATENT OFFICE.

HERMAN E. PEARSON, OF WAYZATA, MINNESOTA.

POWER-DRIVEN SKIS.

Application filed April 14, 1924. Serial No. 706,334.

The object of my invention is to provide a pair of skis with a driving means which will enable the user to travel rapidly over ice and snow.

A further object is to provide a propelling or driving means of simple inexpensive construction which can be mounted on a pair of skis at a comparatively small expense.

A further object is to provide an improved steering device which will enable the rider to easily and quickly control the direction of movement of the skis.

The invention consists generally in various constructions and combinations all as hereinafter described and particularly pointed out in the claims.

In the accompanying drawings forming part of this specification,

Figure 1 is a longitudinal sectional view through the skis illustrating the application of the driving mechanism thereto;

Figure 2 is a plan view of the same;

Figure 3 is a bottom view.

In the drawing, 2 and 3 represent a pair of skis connected and held in parallel relation by a suitable platform 4 secured to the ski runners near the middle portion thereof. The forward ends of the skis are upwardly turned, as usual, and I prefer to close the space between the forward ends by a thin plate 5 of suitable material which will serve as a means of preventing snow and particles of ice from flying back in the face of the rider. 6 is an arm having a hub 7 horizontally pivoted in ears 8 provided on the base of a standard 9 that is secured to the forward portion of the platform 4. The arm extends horizontally over the rear end of the platform and has a fork 10 thereon between the arms of which a driving wheel 11 is mounted. The peripheral surface of this wheel is provided with a series of blades or vanes 12 which are adapted to dig into the soft snow and aid in propelling the skis. I prefer to provide a group of blades upon each side of the transverse center of the wheel and in the center I prefer to provide a ring 13 preferably of rubber or other suitable material having its surface flush substantially with the edges of the blades or it may project slightly beyond these edges if desired. This ring is adapted to engage a hard icy surface and provide traction for the wheel on such surface. The wheel is driven preferably by an internal combustion engine 14 preferably of the single cylinder type having a driving belt connection 15 with the wheel axle and the engine is mounted on the rear portion of the arm 6 and is therefore free to rise and fall with the arm and with the driving wheel and allow the wheel to accommodate itself to the contour of the surface over which the skis are moving. A shaft 16 is journaled on the platform 4 and is provided with a crank arm 17 having a link connection 18 with the arm. A foot-lever 19 is also mounted on said shaft in position to be operated by the rider standing on the platform for the purpose of raising the driving wheel out of contact with the surface over which the skis are moving. A latch device 20 is preferably provided to engage the treadle lever and lock it in its depressed position as indicated by dotted lines in Figure 1. When this lever is released, the arm will drop by gravity and allow the drive wheel to contact with the snow or ice, the weight of the motor being generally sufficient to provide the necessary traction. When the motor is started, the wheel will be revolved and the skis propelled rapidly over the snow or ice.

The driving means, it will be noted, is near the middle of the skis, the wheel operating between the rear portions of the skis in distinction from the driving arrangement shown in my pending application for a motor driven toboggan filed March 1, 1924, Serial #696,358.

To enable the rider to readily steer the skis, I provide an upright post 21 mounted in the standard 9 and having a hand wheel 22 at its upper end and a shoe or blade 23 mounted on its lower end beneath the platform 4 in position to contact with the snow or ice and guide the skis as the steering post is rotated. The steering post extends up a sufficient distance to allow the rider standing on the platform to easily grasp the steering wheel and at the same time be in position where he can reach the foot lever 19 and the locking latch 20 with his foot and control the driving of the skis. Evidently, the speed of the skis can be regulated by raising and lowering the driving wheel, decreasing or increasing the traction as desired.

I claim as my invention:

1. The combination with a pair of runners and a platform mounted thereon, of an arm pivoted on said platform and projecting rearwardly thereover, a driving wheel mounted in said arm between the rear portions of said runners and having peripheral means for engaging the ice and snow to drive said runners, a driving means carried by the rear portion of said arm and connected with said wheel, a foot lever mounted on said platform and connected with said arm for lifting it and said wheel, a lock device for said foot lever, said lever when released allowing said arm and driving means to drop by gravity and force said wheel into the ice or snow.

2. A device of the class described comprising a platform having runners, an arm having a hub at its forward end horizontally pivoted on said platform, said arm projecting rearwardly between said runners and centrally with respect thereto, a wheel mounted in the rear portion of said arm and having peripheral means for engaging the ice or snow, a shaft having a foot lever thereon, an arm on said shaft having a link connecting it with said wheel-supporting arm, means for locking said foot lever to hold said wheel-supporting arm in its elevated position, the release of said foot lever allowing said wheel and arm to drop by gravity and engage the ice or snow, a steering post having an upright bearing near the hub of said arm, and a steering blade connected with said post beneath said platform and having an edge to engage the ice or snow.

3. A ski comprising a pair of closely spaced runners, a platform connecting and bridging the runners to leave a portion of their rear ends exposed, a standard arranged centrally of the platform lengthwise thereof, a steering post rotatable in the standard and having a steering blade beneath the platform beneath the runners and arranged as a trailer, said blade thus being beneath the rider's station, and an arm pivoted to said standard and extending rearwardly and having a driven traction wheel operable between the runners.

4. A ski having a trailing steering blade therebeneath arranged substantially centrally of the ski in both directions, and forwardly of and substantially adjacent the rider's station, and a steering post attached to the blade at its forward end, and means engageable rearwardly of the ski between the runners for driving the same, said means being supported on an element which is pivoted at one end only adjacent the steering post.

5. In combination with a pair of runners and a platform mounted thereon to skim the snow, a steering post arranged substantially centrally of the ski in both directions, a trailing steering blade connected only by its forward end to said post, said blade extending rearwardly toward the rider's station, and an arm pivoted at one end adjacent said steering post forwardly of the rider's station, and extending rearwardly and having driven tractor means operable between the runners.

6. A ski comprising a pair of closely spaced runners, a platform connecting and bridging said runners and adapted to skim the snow, a steering blade upon said platform beneath the same arranged substantially centrally of the ski in both directions, means for operating the steering blade, and means engageable rearwardly of the ski for driving the same.

7. A ski comprising a pair of closely spaced runners, a platform connecting and bridging said runners and adapted to skim the snow, said runners being exposed at the rear of the platform, a steering blade upon said platform beneath the same arranged substantially centrally of the ski in both directions, means for operating the steering blade, and means engageable rearwardly of the ski between the runners for driving the same.

8. A ski comprising a pair of closely spaced runners, a platform connecting and bridging said runners and adapted to skim the snow, said runners being exposed at the rear of the platform, a steering blade upon said platform beneath the same arranged substantially centrally of the ski in both directions and forwardly of and substantially adjacent the rider's station, means for operating the steering blade, and means engageable rearwardly of the ski between the runners for driving the same.

In witness whereof, I have hereunto set my hand this 11th day of April, 1924.

HERMAN E. PEARSON.